(12) United States Patent
Tucker

(10) Patent No.: US 10,209,460 B2
(45) Date of Patent: Feb. 19, 2019

(54) CONNECTOR UNIT COMPRISING TWO CONNECTOR PARTS

(71) Applicant: Siemens Aktiengesellschaft, Munich (DE)

(72) Inventor: David Michael Tucker, Millom (GB)

(73) Assignee: Siemens Aktiengesellschaft, Munich (DE)

( * ) Notice: Subject to any disclaimer, the term of this patent is extended or adjusted under 35 U.S.C. 154(b) by 39 days.

(21) Appl. No.: 15/419,541

(22) Filed: Jan. 30, 2017

(65) Prior Publication Data

US 2017/0242197 A1     Aug. 24, 2017

(30) Foreign Application Priority Data

Feb. 23, 2016   (EP) .................................... 16156855

(51) Int. Cl.
| | |
|---|---|
| *G02B 6/38* | (2006.01) |
| *H01R 13/04* | (2006.01) |
| *H01R 13/523* | (2006.01) |
| *H01R 13/639* | (2006.01) |
| *H01R 43/26* | (2006.01) |
| *H01R 13/52* | (2006.01) |

(52) U.S. Cl.
CPC ........... *G02B 6/387* (2013.01); *G02B 6/3816* (2013.01); *G02B 6/3821* (2013.01); *G02B 6/3893* (2013.01); *H01R 13/04* (2013.01); *H01R 13/523* (2013.01); *H01R 13/5219* (2013.01); *H01R 13/5227* (2013.01); *H01R 13/639* (2013.01); *H01R 43/26* (2013.01)

(58) Field of Classification Search
CPC .... G02B 6/3816; G02B 6/387; G02B 6/3893; H01R 13/5219; H01R 13/5227; H01R 13/523; H01R 13/639
See application file for complete search history.

(56) References Cited

U.S. PATENT DOCUMENTS

| | | | |
|---|---|---|---|
| 5,957,716 A * | 9/1999 | Buckley ............... | H01R 13/622 285/92 |
| 6,475,008 B1 | 11/2002 | Marolda et al. | |
| 6,568,266 B1 * | 5/2003 | Desa ................... | G01L 19/0092 73/1.57 |

(Continued)

FOREIGN PATENT DOCUMENTS

GB            1360533 A   *   7/1974  ............ F16L 37/098

OTHER PUBLICATIONS

EP Search Report dated Aug. 17, 2016, for EP patent application No. 16156855.5.

*Primary Examiner* — Daniel Petkovsek
(74) *Attorney, Agent, or Firm* — Beusse Wolter Sanks & Maire

(57) ABSTRACT

A connector unit having a first connector part and at least a second connector part, wherein the first connector part and the at least second connector part are connectable during a mating of the first connector part and the at least second connector part and are dis-connectable during a de-mating of the first connector part and the at least second connector part, and further having at least a first locking assembly for locking the first connector part and the at least second connector part at least during the de-mate of the first connector part and the at least second connector part. At least first locking assembly has at least a first hydraulic lock.

13 Claims, 6 Drawing Sheets

(56) References Cited

U.S. PATENT DOCUMENTS

| | | | |
|---|---|---|---|
| 6,929,404 B2 | 8/2005 | Jones et al. | |
| 8,226,303 B2 * | 7/2012 | Toth | G02B 6/3816 385/53 |
| 8,585,098 B2 * | 11/2013 | Lundgren | E02F 3/3654 285/124.2 |
| 8,794,354 B2 * | 8/2014 | Xu | E21B 10/322 175/268 |

* cited by examiner

CONNECTOR UNIT COMPRISING TWO CONNECTOR PARTS

CROSS REFERENCE TO RELATED APPLICATIONS

This application claims the benefit of European Application No. EP16156855 filed 23 Feb. 2016, incorporated by reference herein in its entirety.

FIELD OF INVENTION

The present invention relates to a connector unit comprising a first connector part and at least a second connector part and to a method for operating the aforementioned connector unit.

ART BACKGROUND

In the near future an increasing demands of communication over wide distances, especially for example between continents will be needed. Hence, infrastructures, like sea cables and connectors linking sea cables, that are located and operated error proof in harsh environments, like subsea, will be essential. State of the art connectors use for example a male pin and a female socket to enable connection. To mate these parts subsea the male pin must pass through a seal of the female socket without allowing water from the sea into the connector internals. It is known to deploy e.g. a spring loaded shuttle piston that fits intimately with a tip of the male pin (receptacle pin) and is driven back through the seals during the mate. When the connector is de-mated, the spring maintains contact between the male pin (receptacle) and the shuttle piston thus preventing water transmission through the seal. This solution requires a spring with a significantly high spring rate to prevent accidental compression of the spring. Thus, it is mostly dependent on spring force compression. The high spring rate means that the force significantly increases during the mate. Moreover, there is a high risk of a premature separation of the male pin and the shuttle piston, especially during the de-mate or partial mate/de-mate due to that the return spring is at is weakest at the early stage of the mate. A spring loaded shuttle pin also drives the length of the connector, causing it to be longer than might be possible with alternative means of keeping water out of the connector. Such an arrangement is, for example, known from U.S. Pat. No. 6,929,404 B2.

SUMMARY OF THE INVENTION

It is a first objective of the present invention to provide a connector unit comprising a first connector part and at least a second connector part that may be operated with minimum force and may be constructed shorter in length compared to state of the art connectors. Moreover, the connector unit should be reliable and insusceptible to errors.

It is a further objective of the present invention to provide a method for operating the aforementioned connector unit that provide quick, reliable and unfailing mating and/or de-mating of the parts of the connector unit. These objectives may be solved by a connector unit and a method according to the subject-matter of the independent claims.

According to a first aspect of the present invention a connector unit comprising a first connector part and at least a second connector part, wherein the first connector part and the at least second connector part are connectable during a mating of the first connector part and the at least second connector part and are dis-connectable during a de-mating of the first connector part and the at least second connector part, and further comprising at least a first locking assembly for locking the first connector part and the at least second connector part at least during the de-mate of the first connector part and the at least second connector part.

It is proposed, that the at least first locking assembly comprises at least a first hydraulic lock. Due to the inventive matter, a connection between the first and at least second connector part can be strengthened and be maintained intact, especially, during a de-mate of the parts. Hence, a premature or accidental separation of the parts can be advantageously avoided or its risk minimized. Moreover, the mating and/or de-mating of the connector parts of the connector unit can be performed with reduced danger of failure of the connector unit in comparison of state of the art systems. This is true especially in view of water or contamination accidentally entering the connector unit or compensating medium loss. Thus, a reliable and error proof connector unit may be provided, which offers convincing properties, especially for subsea applications. Moreover, mating and de-mating forces are minimised and occur only during the connecting and/or dis-connecting process. Furthermore, a length of the connector unit is reduced in comparison with known connectors. This is the case because the shuttle piston is no longer driven by the spring, which has to be stored in the mated (compressed) position which typically drives the length of known connectors. In addition, due to the hydraulic lock high connecting forces can be provided.

Even if the terms "connector part, locking assembly, lock, chamber, valve, fluid, housing, piston, housing part, aperture, stopper, bias device, element, pin, seal and spring" (see also below) are used in the singular or in a specific numeral form in the claims and the specification the scope of the patent (application) should not be restricted to the singular or in the specific numeral form. It should also lie in the scope of the invention to have more than one or a plurality of the above mentioned structure(s).

A connector unit is intended to mean a unit which physically connects at least two parts, like two cables, in particular subsea cables, or a cable with a—subsea—module (e.g. a transformer, a pump etc.) or a busbar inside of the module or two modules, respectively. Thus, it is advantageously a subsea connector unit. The connector unit may be used in any harsh environment and may be embodied as an optical or an electrical connector and/or penetrator or advantageously as a wet mateable connector/penetrator. Under a physically connects should be understood the use of any connection feasible for a person in the art, like optical, electrical or magnetic. However, it is advantageously employed in an optical application or in a high voltage application.

Such a connector unit comprises at least two mateable connector parts that in the embodiment as an optical connector unit each comprises at least one optical fibre, wherein the optical fibre of the first connector part and the optical fibre of the at least second connector part are embodied in such a way to establish an optical connection after a mate of the first and second connector part.

In case of the connector unit as an electrical connector unit the unit comprises at least a conductor part that helps to establish an electrical connection in a mated position of two connected parts, like two cables or a cable with a module.

The connector part may be a male part, in other words it comprises a pin, like a conductor pin, receptacle pin or male part of a connector or of a penetrator, or the connector part may be a female part, in other words it comprises an aperture e.g. to receive a pin of the male part and may be a socket contact of a female part, plug or socket or connector body of a connector for contacting a (conductor) pin of a male part. Thus, the connector part may be embodied as the male part and/or as the female part. This may also apply to the connector parts of the optical connector unit in case one optical fibre of the first connector part is embodied to pass into a body of the second connector part to connect with the optical fibre of the second connector part.

Hence, the female part is intended to mean a part of the connector unit with an opening, recess, bore or cavity to receive another part of the connector unit, like an optical fibre. Moreover, in case of an embodiment of the connector unit as comprising a penetrator one optical fibre is permanently connected to a cable or a module via a housing. Moreover, the male and female parts may need to be locked together once fully mated for example by means of a lock or clamp on external metalwork.

A locking assembly is intended to mean an assembly of at least two parts that connects or locks the connector parts with each other in at least one state of the connector unit like the mated state or during a de-mate. A locking mechanism may be any feasible for a person skilled in the art, like a force and/or form-fit (clamping, magnetism, gluing, hydraulic etc.). Advantageously, the locking mechanism is reversible or lockable and unlockable. Moreover, a hydraulic lock is intended to mean any lock that has a locking function that is based on hydraulic principles. The hydraulic lock is a force-fitting connection, wherein a force or power transmission of the hydraulic lock is done or established between at least two parts that are locked via the hydraulic lock. The hydraulic lock provides a direct force or power transmission between these parts.

Furthermore, it is provided that the at least first hydraulic lock comprises at least one balancing chamber and at least one valve via which the balancing chamber is fillable and/or unfillable with an uncompressible fluid. Hence, the hydraulic lock is constructed with simple parts and the uncompressible fluid can be conveniently stored in the balancing chamber. The balancing chamber forms the hydraulic lock. The filling or emptying occurs in the unlocked state of the hydraulic lock and the uncompressible fluid is located in the balancing chamber at least in the unlocked state of the hydraulic lock. Moreover, an uncompressible fluid is intended to mean any medium that can adopt or can be brought into a state where it is uncompressible, like system or environmental fluid e.g. water or oil.

Moreover, the at least one balancing chamber of the at least first hydraulic lock is encased by a housing and a piston being guided in the housing. Thus, a change in volume of the balancing chamber can be easily done by a movement of the piston in the housing. Consequently, the piston is moveably mounted in the housing. Furthermore, the movement of the piston mediates the filling and emptying of the balancing chamber. Advantageously, the housing and the piston are parts of a shuttle pin arrangement and also referred to as shuttle pin main housing and shuttle pin piston.

A shuttle pin arrangement is intended to mean a part of the unit that supports, facilitates or mediates the connection between the female and the male part of the unit. Further, the shuttle pin arrangement is intended to provide a secure, sealed and in case of an watery environment a leakage free mating of the male and female parts. The shuttle pin arrangement comprises several parts e.g. at least one housing part, pin/piston or bias device. Specifically, the shuttle pin arrangement comprises at least a stopper and a shuttle pin with the shuttle pin main housing (main housing), the shuttle pin piston (piston), a shuttle pin piston spring (piston spring), a shuttle pin piston retainer housing (retainer housing) and shuttle pin piston retainer housing spring (retainer spring) as well as a shuttle pin spring. The shuttle pin main housing is pushed forwards from the stopper by the shuttle pin spring so that, when no other forces are acting on the shuttle pin, it rests in its fully extended state. Further, the shuttle pin main housing and the retainer housing are dislocated, advantageously axially, against the shuttle pin spring during the mate or de-mate. Furthermore, the shuttle pin piston is pushed forwards from by the shuttle pin piston spring and the shuttle pin retainer housing is pushed forwards by the shuttle pin retainer housing spring (detail see below).

A feature of the shuttle pin piston is a small recess in its front portion which interacts with a corresponding protrusion formed a front of the male connector part. These features are to aid in the alignment of the two structures. Moreover, the shuttle pin piston comprises a central travel bar that extends from the front portion backwardly to the stopper and is accommodated by the shuttle pin piston retainer housing during the mate, the de-mate and in the mated state of the connector unit.

All spring(s) may be (a) light constant force spring(s) or (a) standard/light coil spring(s). Actually, it has been shown, that standard/light coil springs may be of advantage. Additionally, it may be also possible to use a combination of these spring types. However, the shuttle pin retainer housing spring is the strongest spring of the springs of the shuttle pin arrangement.

It is further provided, that the at least one valve is built by a first housing part and an at least second housing part providing an easily operatable valve. Advantageously, the first housing part and the at least second housing part are arranged relatively movable towards each other. Thus, an opening and closing of the valve can be advantageously realised by the relative movement. Advantageously, the first housing part is a part of the shuttle pin main housing and the second housing part is a part of the shuttle pin retainer housing. Thus, the relative movement and hence the operating of the valve can be done by the displacement of the shuttle pin (details see below). Moreover, the filling and emptying of the balancing chamber can be facilitated easily. The second housing part is advantageously an axially fixed seat hold into position by a spring and specifically by the shuttle pin retainer housing spring.

In an embodiment of the invention the first housing part comprises a conical aperture providing a structure for a gradual and smooth engagement of the interacting housing parts. Moreover, the at least second housing part comprises a plug providing a robust element for the interacting. Advantageously, the conical aperture mounts the plug in the closed state of the at least one valve and/or the conical aperture is free of the plug in the open state of the at least one valve. In other words the first and the second housing part built a conical seat. Consequently, a secure and reliable mounting of the plug and a secure and reliable closed state of the valve can be provided. A plug should also be understood as a stopper and the term mount should be understood as house. Further, the closed state of the valve is established during the mate and in the mated state of the connector unit and the open state during the de-mate and an unmated state.

It is further provided, that the at least first locking assembly comprises at least a first bias device that is arranged in the balancing chamber. By arranging the first bias device in the balancing chamber a space saving arrangement can be provided. The bias device may be any element feasible for a person skilled in the art and/or that can be biased or especially, that may store a reset and/or an elastic force, like a spring, an elastomer, rubber etc. Advantageously, the bias device is a spring. Moreover, the first bias device advantageously contacts a part of the balancing chamber and is biased against the piston. Hence, the piston is easily held into position by the first bias device and specifically by a fully extended first bias device in its resting position e.g. in the unmated state of the connector unit. The first bias device is arranged between a rear surface of the shuttle pin piston and a flange of the shuttle pin main housing. Thus, the first bias device is advantageously the shuttle pin piston spring. By arranging the first bias device in this way a direct transfer of the spring force can be realised.

In an advantageously embodiment of the invention the housing is arranged in the at least second connector part and/or wherein the second connector part is a female part of the connector unit. Hence, the housing can be embodied as the recess or aperture to receive the male connector part or pin, respectively. Consequently, the housing can facilitate two functions, namely, to receive the male pin and to provide the housing of the first hydraulic lock.

According to a further advantageous embodiment of the invention the at least second housing part of the at least one valve is hold into position by at least one bias device. Thus, the axially fixed seat can be established easily providing a secure and reliable opening and closing of the valve. The definition of the bias device provided above also applies here. As stated above, the bias device or spring is advantageously the shuttle pin retainer housing spring.

In a further aspect of the invention one of the housing parts of the first housing part and the at least second housing part of the at least one valve is arranged moveably. Due to this a separate means for opening and closing the valve can be omitted because these actions can be realised by the movement of the housing part. Furthermore, one of the housing parts of the first housing part and the at least second housing part of the at least one valve is arranged fixed (in position). This ensures that the opening and closing actions of the valve are controlled easily.

In a further realisation of the invention the first connector part comprises an element that establishes a second lock of the at least first locking assembly at least during the de-mating of the first connector part and the at least second connector part. Hence, an even better locking can be provided enhancing the security and reliability of the connector unit further. The element of the first connector part may be any element, structure or part feasible for a person skilled in the art, like a pin, a hook, an aperture etc. Advantageously, the element is the male pin of the first connector part or at least its tip. The second lock may be working with every mechanism feasible for a person skilled in the art, like clamping, gluing, magnetism, hydraulic etc. Advantageously, the second lock is a hydraulic lock. Thus, the at least first locking assembly comprises at least a second hydraulic lock. Due to this, the same principles and in part pieces can be used for the first and the second hydraulic lock. This saves space, parts, costs and mounting effort.

It is further provided, that the at least second hydraulic lock comprises a balancing chamber being encased by a housing. Advantageously, the housing comprises a part of the shuttle pin main housing and a front end of the shuttle pin piston. Furthermore, the at least second hydraulic lock comprises a piston being guided in the housing. Thus, a change in volume of the balancing chamber can be easily done by a movement of the piston in the housing. The piston is advantageously the element (e.g. male pin) of the first connector part.

Advantageously, the at least second hydraulic lock comprises a first seal and at least a second seal, wherein the first seal is arranged at the housing and wherein the at least second seal is arranged at the piston (e.g. at the male pin). Advantageously, the first seal is arranged at the shuttle pin piston. The second hydraulic lock is activated by the closing of the balancing chamber. This can be done by sealing at least one side of the balancing chamber e.g. by inserting the element/piston with its seal (second seal) in the already sealed housing (by the first seal). Alternatively and/or additionally it may be also possible to establish the final sealing action by dislocating the seal of the housing (first seal) in a sealing configuration.

According to a further aspect of the present invention, a method for operating a connector unit comprising a first connector part and at least a second connector part, is presented, wherein the first connector part and the at least second connector part are connectable during a mating of the first connector part and the at least second connector part and are dis-connectable during a de-mating of the first connector part and the at least second connector part, and further comprising at least a first locking assembly for locking the first connector part and the at least second connector part at least during the de-mate of the first connector part and the at least second connector part.

It is proposed, that the method comprises at least the following steps: Pushing the first connector part into the at least second connector part and thus closing at least a first hydraulic lock of the at least first locking assembly and thus locking the first connector part and the at least second connector part with each other.

Due to the inventive method, a connection between the first and at least second connector part can be strengthened and be maintained intact, especially, during a de-mate of the parts. Hence, a premature or accidental separation of the parts can be advantageously avoided or its risk minimized. Moreover, the mating and/or de-mating of the connector parts of the connector unit can be performed with reduced danger of failure of the connector unit in comparison of state of the art systems. This is true especially in view of water or contamination accidentally entering the connector unit or compensating medium loss. Thus, a reliable and error proof connector unit may be provided, which offers convincing properties, especially for subsea applications. Moreover, mating and de-mating forces are minimised and occur only during the connecting and/or dis-connecting process. Furthermore, a length of the connector unit is reduced in comparison with known connectors. This is the case because the shuttle piston is no longer driven by the spring, which has to be stored in the mated (compressed) position which typically drives the length of known connectors. In addition, due to the hydraulic lock high connecting forces can be provided.

The locking is done during the mate of the connector parts and is maintained in the mated state of the connector unit.

In an embodiment of the invention the method comprises the steps of: Pushing a first housing part of the first connector part or the at least second connector part or specifically, a conical aperture thereof onto an at least second housing part of the first connector part or the at least second connector part or specifically, onto a plug thereof and thus closing at least one valve of at least a first hydraulic lock of the at least first locking assembly built by the first housing part and the at least second housing part and thus locking the first connector part and the at least second connector part towards each other. This sequence is a method for locking a first connector part and at least a second connector part of a connector unit. Hence, a gradual and smooth engagement of the housing parts can be provided resulting in a reliable closing of the valve and a secure locking of the connector parts.

In an advantageously embodiment of the invention the method comprises the further steps of: Pulling the first connector part from the at least second connector part and thus opening the at least first hydraulic lock of the at least first locking assembly by using at least a second lock of the at least first locking assembly and thus unlocking the first connector part and the at least second connector part. According to this the unlocking of the first hydraulic lock can be performed reliably and controlled. Thereby the second hydraulic lock ensures the safe connection of the connector parts as well as the opening of the first hydraulic lock. The unlocking is done during the de-mate of the connector parts.

In more detail the method comprises the steps of: Pulling a first housing part of the first connector part or the at least second connector part or specifically, a conical aperture thereof from an at least second housing part of the first connector part or the at least second connector part or specifically, from a plug thereof and thus opening at least one valve of at least a first hydraulic lock of the at least first locking assembly built by the first housing part and the at least second housing part by using at least a second lock of the at least first locking assembly and thus unlocking the first connector part and the at least second connector part from each other. This sequence is a method for unlocking a first connector part and at least a second connector part of a connector unit. Due to this, the dis-engagement can be performed smoothly.

According to a further aspect of the present invention the method comprises the further step of: Activating the at least first hydraulic lock by the mate of the first connector part and the at least second connector part. Hence, further or additional mean for the activation can be omitted.

Moreover, the invention relates to a shuttle pin with the above described characteristics for a use is the inventive connector unit and method. Thus, a connection between the male connector part and the female connector part may be most efficiently supported resulting in a smooth and reliable mating and/or de-mating process.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
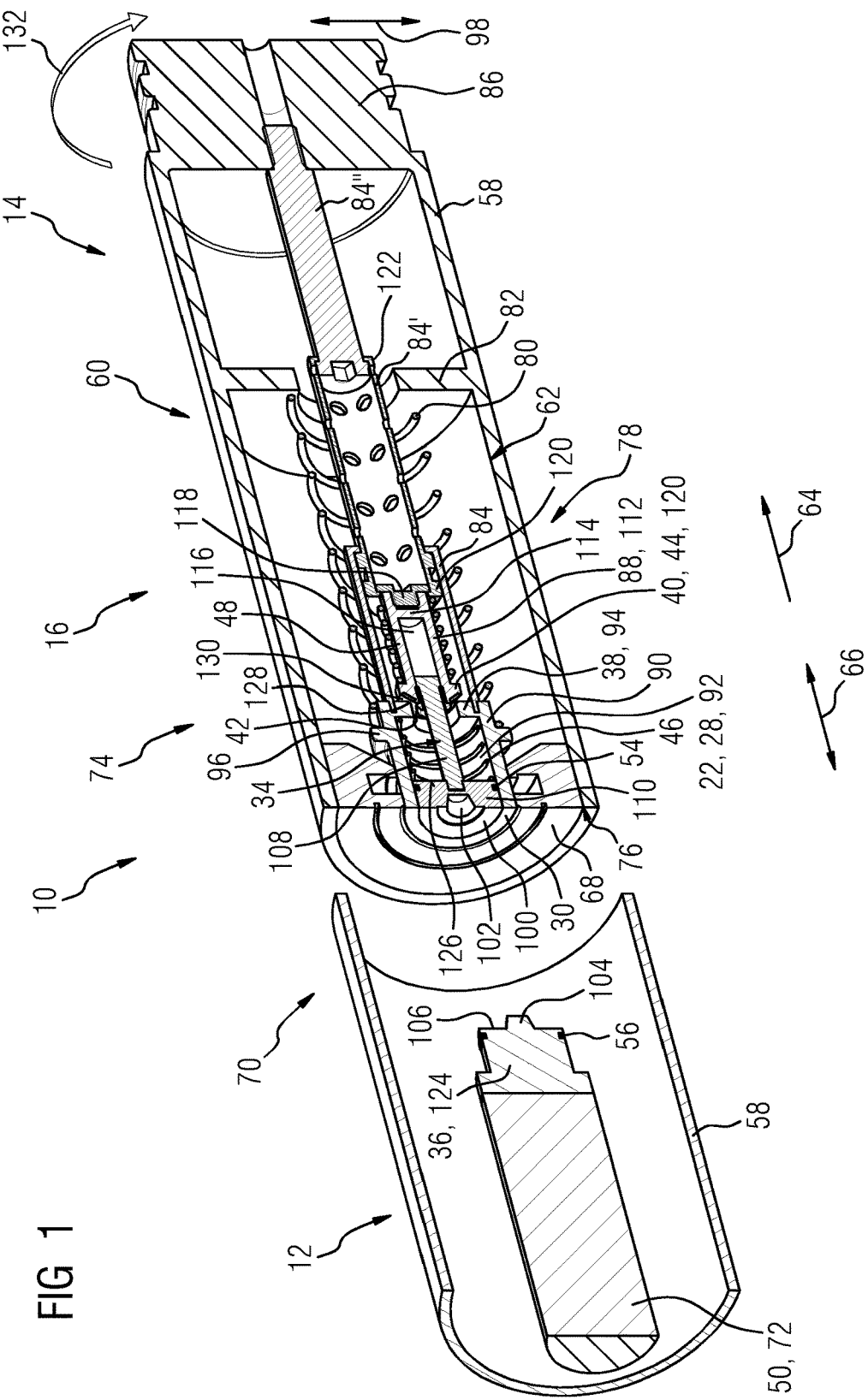
FIG. 1: shows schematically an inventive subsea connector unit with a male part, a female part and a shuttle pin arrangement beforehand of mating.

The illustrations in the drawings are schematically. It is noted that in different figures, similar or identical elements are provided with the same reference signs.

FIG. 1 shows an inventive wet mateable optical and/or high voltage subsea connector unit 10 for connecting two connected parts, like two subsea cables (not shown), wherein the connector unit 10 comprises two connector parts 12, 14 in the form of a first or a male part 12 (receptacle/pin) and a second or a female part 14 (plug) that are embodied in such a way to establish a physical and specifically an optical connection after a mate of the male part 12 and the female part 14. The connector parts 12, 14 are intended for a use in a subsea application. Both the male part 12 and the female part 14 are each encased in a housing 58, which will be axially aligned during a mating or demating process of the male and female parts 12, 14.

The female part 14 is located at a plug front end 60 of e.g. a subsea cable and comprises an axially extending bore 62 to receive the male connector part 12 during a mate of the connector parts 12, 14 in mating direction 64 that is coaxial to an axial direction 66. The bore 62 comprises with seals 68 for preventing entering of water or dirt into internals of the female part 14.

Figure 6:
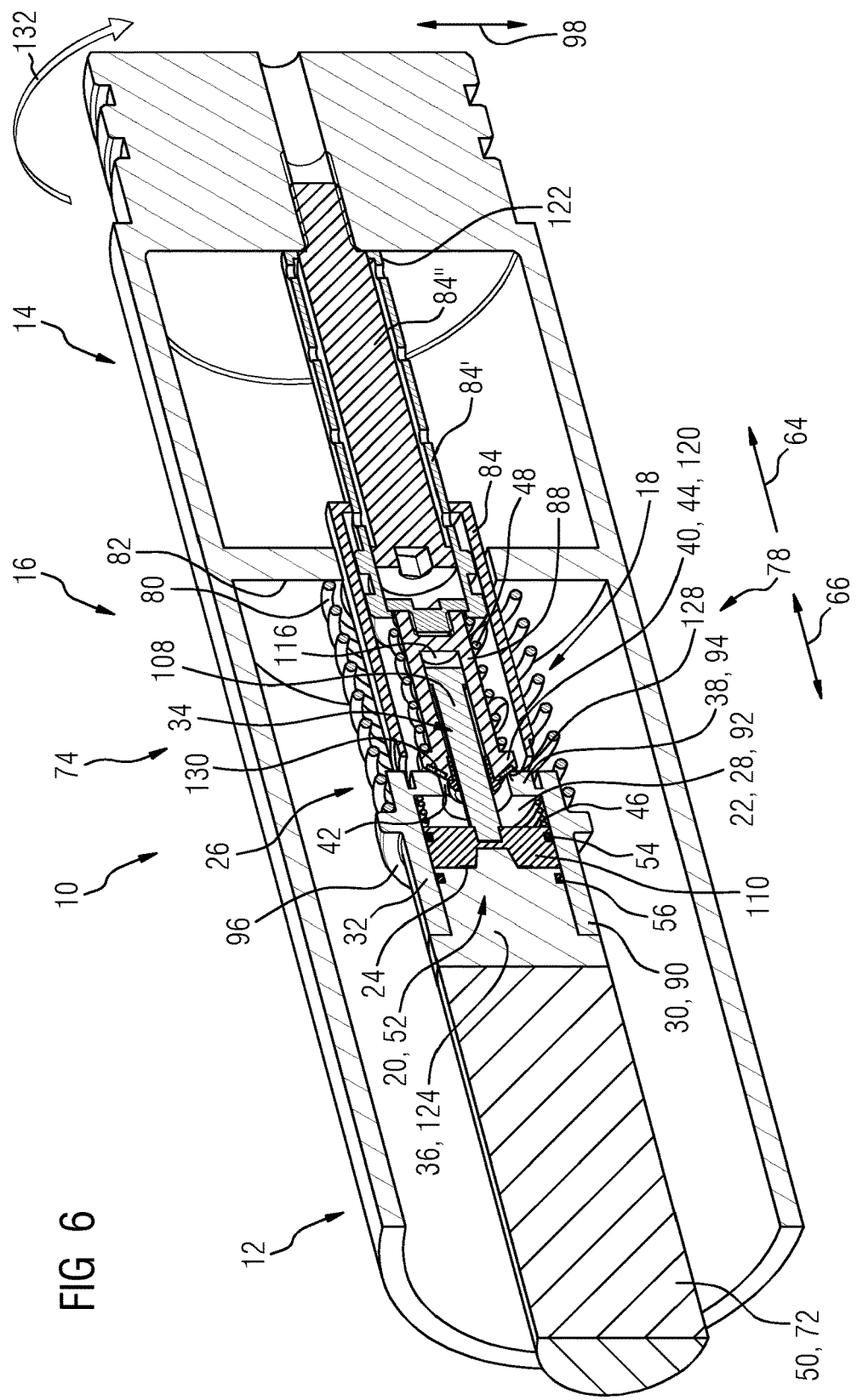
FIG. 6: shows schematically the subsea connector unit from FIG. 1 in a mated state.

The male part 12 is located at a receptacle front end 70 of e.g. the other subsea cable and comprises a receptacle pin assembly 72. For a mating of the male and female parts 12, 14 the bore 62 and the receptacle pin assembly 72 will be arranged vertically aligned towards each other, so that by moving the receptacle pin assembly 72 in direction of the female part 14 or the mating direction 64, the receptacle pin assembly 72 can partially enter the bore 62 of the female part 14. Due to a proper positioning of the receptacle pin assembly 72 in the bore 62 of the female part 14 an optical and/or electrical connection is established. Therefore the male part 12 and the female part 14 each comprise at least one not further shown contact element, like an optical ferrule or an electrical wire. This mating position is schematically shown in FIG. 6 (details see below).

The connector unit 10 further comprises a shuttle pin arrangement 74 to support the connection between the female and the male parts 12, 14. Moreover, the shuttle pin arrangement 74 is designed to keep water out of the female part 14 of the subsea connector unit 10. The shuttle pin arrangement 74 is inserted into a front end 76 of the bore 62 of the plug front end 60. In the unmated position a front of the shuttle pin arrangement 74 is flush with the front of the female part 14 or its front seal 68, respectively.

The shuttle pin arrangement 74 comprises a shuttle pin 78, a bias device 80 and especially, a shuttle pin spring 80 and a stopper 82, wherein the shuttle pin 78 is pushed forwards from the stopper 82 by the shuttle pin spring 80 so that, when no other forces are acting on the shuttle pin 78, it rests in its fully extended state. The shuttle pin 78 is connected via three retainer elements 84, 84', 84" with internals 86 of the female part 14.

The shuttle pin 78 comprises a shuttle pin main housing 30 (in the following text referred to as main housing), a shuttle pin piston 34 (in the following text referred to as piston), a bias device 46 and especially, a shuttle pin piston spring 46 (in the following text referred to as piston spring), a shuttle pin piston retainer housing 88 (in the following text referred to as retainer housing) and a bias device 48 and especially, a shuttle pin piston retainer housing spring 48 (in the following text referred to as retainer spring).

The main housing 30 is built by a tubular bushing 90 extending in the mounted state in an axial direction 66 that provides a cavity 92 and comprises a bottom 94 and a stopper 96 extending in radial direction 98. The stopper 96 provides a contact surface for the shuttle pin spring 80. The piston 34 and the piston spring 46 are positioned inside the cavity 92, wherein the piston 34 is pushed forwards from the bottom 94 by the piston spring 46 so that a front face 100 of the piston 34 is flush with the front seal 68 of the female part 14. Moreover, the piston 34 comprises is a small recess 102 in its front face 100 which interacts during the mate with a corresponding protrusion 104 formed in a front face 106 of the male connector part 12.

To retain the piston 34 inside the cavity 92 it comprises a central traveling bar 108 that is attached loss-proof to the retainer housing 88. Further, the travel bar 108 extends from a front portion 110 of the piston 34 backwardly to the stopper 82. The front portion 110 is basically a disc comprising the front face 100 and a seal 54 sealing the bore 62 against e.g. water in which the connector unit 10 is submerged. The retainer housing 88 is built by a tubular bushing 112 extending in the mounted state in axial direction 66 and comprises a bottom 114 and a cavity 116 to accommodate the traveling bar 108 during the mate, the de-mate and in the mated state of the connector unit 10.

The first retainer element 84 is built by a hollow cylinder. It is attached with its front portion to the main housing 30 and extends in the mounted state in axial direction 66 in direction of the stopper 80. A rear end of the first retainer element 84 is attached axially fixed with the second retainer element 84', which is also formed a hollow cylinder and extends in the mounted state in axial direction 66 in direction of the stopper 80. The retainer housing 88 is positioned inside the first retainer element 84 and is hold loss-proof by the second retainer element 84' via a threaded bolt 118 screwed into the bottom 114 of the retainer housing 88.

The retainer housing 88 and the second retainer element 84' each comprise a shoulder 120, wherein the retaining spring 48 is positioned between the shoulders 120 and the retainer housing 88 is pushed forwards from the shoulder 120 of the second retainer element 84' by the retainer spring 48 so that the retainer housing 88 remains in an axially fixed position. The third retainer element 84" is formed by a bolt, wherein its backwards end is screwed to internals 86 of the female part 14 and its forward end or bolt head is hold loss-proof inside an end region 122 of the second retainer element 84'. The end region 122 of the second retainer element 84' is positioned basically at the same axial length than the stopper 80.

To ensure a reliable and secure mate and de-mate of the connector unit 10 and to prevent a premature or accidental separation of the connector parts 12, 14 the connector unit 10 comprises a locking assembly 16 for locking the first connector part 12 and the second connector part 14 during the mate and de-mate of the first connector parts 12, 14.

The locking assembly 16 comprises a first or main hydraulic lock 18 and a second lock 52, also embodied as a hydraulic lock 20 (initial lock). The main hydraulic lock 18 is established between components of the shuttle pin 78 and the initial hydraulic lock 20 is established between an element 50 of the male connector part 12, namely a tip 124 of the male pin or part 12, and parts of the shuttle pin 78.

The main hydraulic lock 18 comprises a balancing chamber 22 and a valve 26 via which the balancing chamber 22 is fillable and/or unfillable with an uncompressible fluid 28, like a volume compensating medium e.g. oil. The balancing chamber 22 of the main hydraulic lock 18 is encased by a housing 30, basically build by the shuttle pin main housing 88, and a rear surface 126 of the piston 34. The piston 34 is guided in the housing 30 during the mate or de-mate of the connector unit 10 (see below). Thus, cavity 92 represents the balancing chamber 22 so that the piston spring 46 of the locking assembly 16 is arranged in the balancing chamber 22 and contacts a part of the balancing chamber 22, specifically the bottom 94 of the main housing 30, and is biased against the piston 34 or its rear surface 126.

Further, the valve 26 is built by a first housing part 38 and a second housing part 40, wherein the first housing part 38 is basically a back surface 128 of the bottom 94 of the main housing 30 and the second housing part 40 is basically a front surface 130 of the shoulder 120 of the retainer housing 88. Since the first housing part 38 or the main housing 30, respectively, is arranged moveably or can be pushed back against the shuttle pin spring 80 and the second housing part 40 of the valve 26 or the retainer housing 88, respectively, is hold into position or arranged axially fixed by the retainer spring 48, the first housing part 38 and the second housing part 40 are arranged relatively movable towards each other.

To build a conical seat during the mate or de-mate of the connector unit 10 the first housing part 38 or the bottom 94 of the main housing 30, respectively, comprises a conical aperture 42 and the second housing part 40 or the shoulder 120 of the retainer housing 88, respectively, comprises a plug 44.

The initial hydraulic lock 20 comprises a balancing chamber 24 being encased by a housing 32, wherein the housing 32 is formed basically from the bushing 90 of the main housing 30, the front face 102 of the piston 32 and from the front face 108 of the element 50 or the tip 124 of the male pin or part 12, respectively. Furthermore, the initial hydraulic lock 20 comprises a piston 36 being guided in the housing 32. The piston 36 is the male pin/part 12 or the tip 124 thereof.

Moreover, the initial hydraulic lock 20 comprises a first seal 54 and a second seal 56, wherein the first seal 54 is arranged at the housing 32 and specifically in circumferential direction 132 around the front portion 110 of the piston 32 and wherein the second seal 56 is arranged at the piston 36 or male pin/part 12 or specifically in circumferential direction 132 around the tip 124 thereof. Both seals 54, 56 are embodied as rubber O-rings.

The male connector part 12 and the female connector part 14 are connectable during a mating of the connector parts 12, 14 and are dis-connectable during a de-mating. As stated above the connector unit 10 further comprises the locking assembly 16 to secure the connection of the parts 12, 14 by locking the connector parts 12, 14 during the mate and de-mate. On the basis of FIGS. 2 to 6 a method for operating the connector unit 10 or specifically, the method for locking or unlocking the connector parts 12, 14 will be explained.

Figure 2:
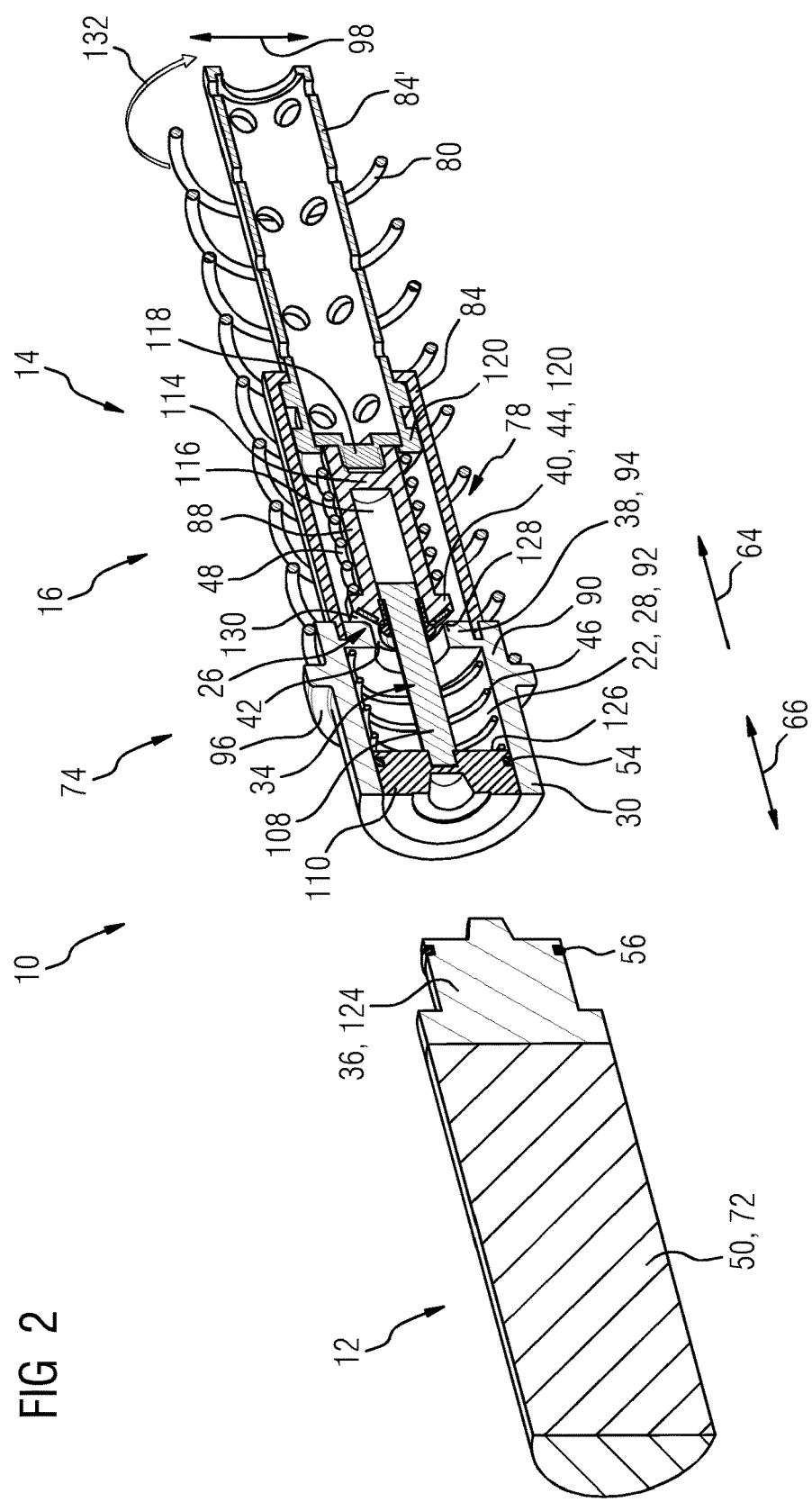
FIG. 2: shows schematically a male pin and the shuttle pin arrangement of the subsea connector unit from FIG. 1, FIG. 3: shows schematically the male pin and a front part of the shuttle pin arrangement from FIG. 2 in a first state of the mate in which a hydraulic lock between the male pin and a shuttle pin of the shuttle pin arrangement is activated and a further hydraulic lock of the shuttle pin arrangement is inactive.

FIG. 2 shows the unmated situation of the male part 12 and the female part 14 with the shuttle pin arrangement 78. In this position the main housing 30 is pushed forward by the spring 80 acting on the stopper 82. Consequently, the first and the second retainer elements 84, 84' are in a forward position due to their axially fixed connection to the main housing 30 and towards each other. To ensure that a front of the shuttle pin 78 is flush with the front seal 68 and not pushed axially out of the female connector part 14 the second retainer element 84' is axially hold into position by the third retainer element 84" or a bolt head of the bolt, respectively. The flush configuration of the front portion 110 of the piston 34 is ensured by the piston spring 46 and the traveling bar 108 hold axially into position by the retainer housing 88. More over the retainer housing 88 is pushed forward by the retainer spring 48.

Thus, in the unmated state the components in the female connector part 14 are fully extended and the valve 26 is open to allow free flow of the uncompressible fluid 28 (oil) from the balancing chamber 22 of the main hydraulic lock 18 into a compensating volume of the connector unit 10 (not shown). Specifically, the conical aperture 42 of the first housing part 38 (at the bottom 94 of the main housing 30) is free of the plug 44 of the second housing part 40 (at the shoulder 120 of the retainer housing 88) in the open state of the valve 26. Or in other words a seat valve is unseated.

Figure 3:
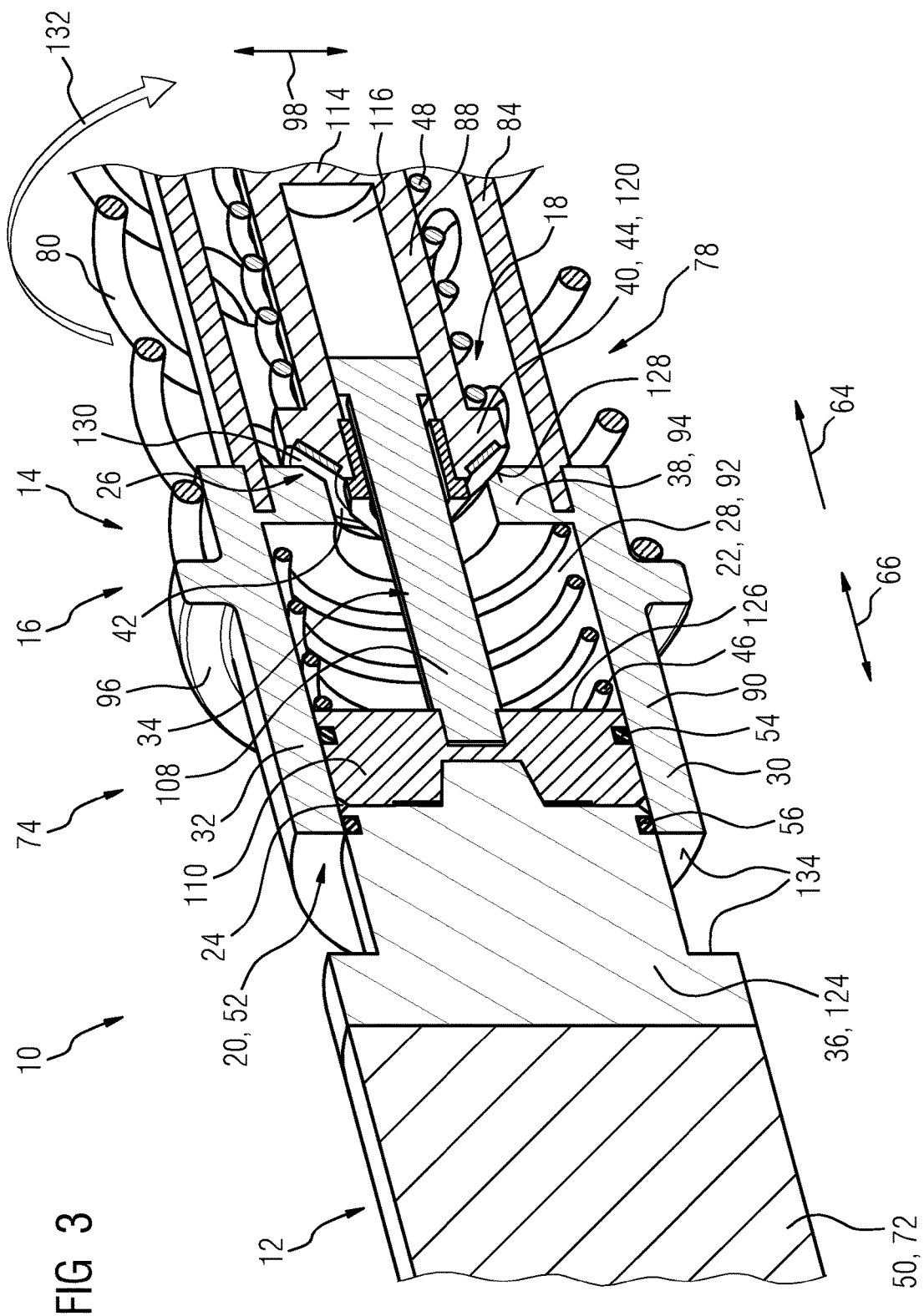
Figure 4:
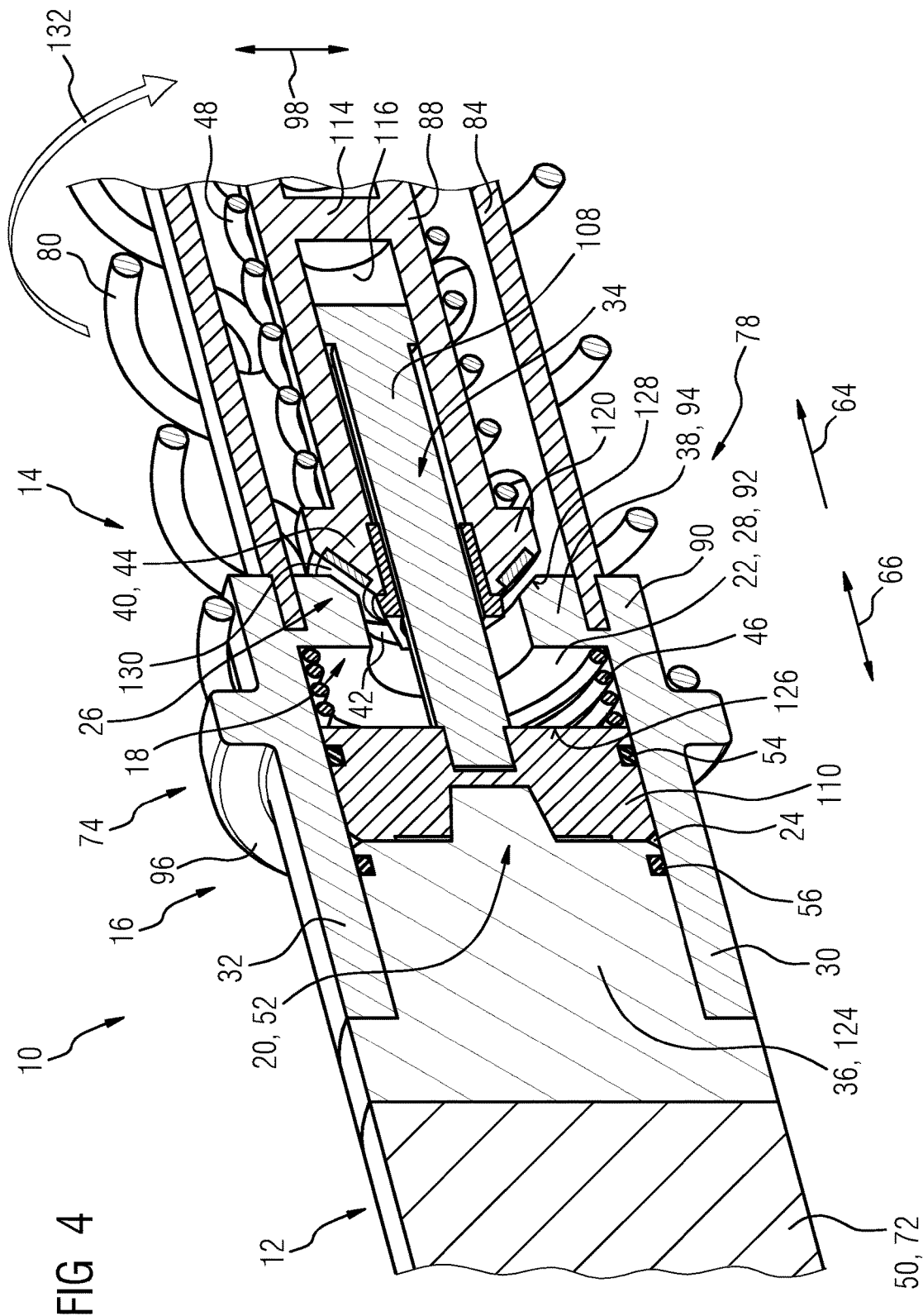
FIG. 4: shows schematically the male pin and a front part of the shuttle pin arrangement from FIG. 2 in a second state of the mate in which the further hydraulic lock of the shuttle pin arrangement is inactive due to an open valve of the further hydraulic lock.
Figure 5:
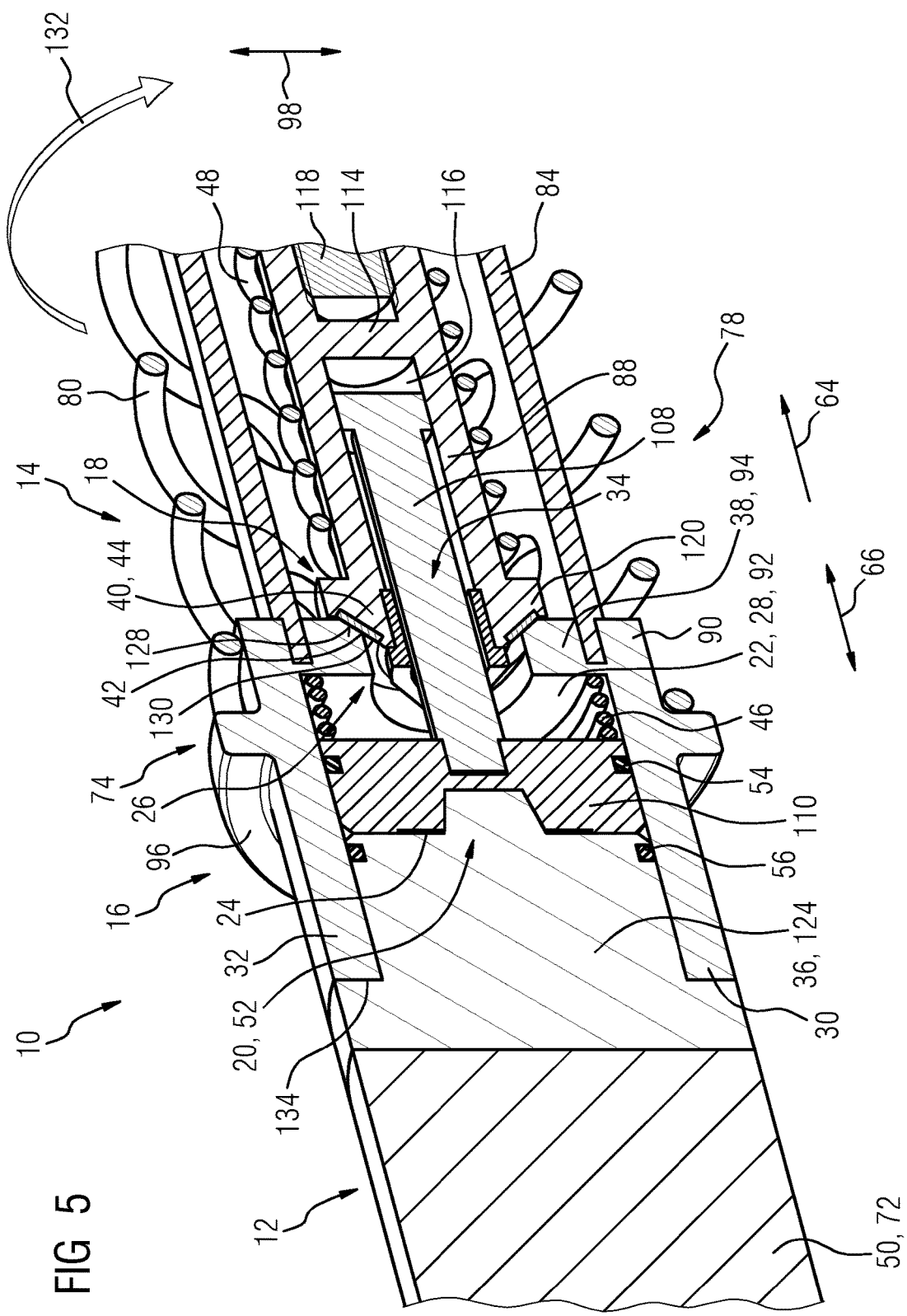
FIG. 5: shows schematically the male pin and a front part of the shuttle pin arrangement from FIG. 2 in a third state of the mate in which the valve of the further hydraulic lock is closed

At the beginning of the mate, what is shown in FIG. 3 showing a first state of the mate, the male connector part 12 or the tip 124 thereof is pushed into the bore 62 of the female connector part 14. As the mating pin or tip 124 makes contact with the shuttle pin piston 34 is centralised by means of the matching interface or faces 102, 108 thus allowing the male pin or part 12 to travel into the cavity 92 housed within the mail housing 30. This forms the initial hydraulic lock 20 between the male pin or part 12 and the shuttle pin piston 34 due to the entering of the tip 124 with the seal 56 into the cavity 92. Hence, the balancing chamber 24 of the initial hydraulic lock 20 and thus the lock 20 itself is sealed, closed or activated. The volume compensating medium (oil) within the cavity 92 is free to flow through e.g. the valve 26 from the cavity 92 as the valve 26 is open or the seat valve is in an unmated state.

By further inserting the male part 12 into the female part 14 the male part 12 pushes the piston 34 backwards and the travel bar 108 is allowed to travel into the cavity 118 of the retainer housing 88 and the volume compensating medium (oil) content within is able to flow out of the retainer housing 88 through e.g. not shown channels in the travel bar 108 and into a main volume of the connector unit 10. During the insertion the piston spring 46 will be compressed completely. The tip 124 of the male part 12 is allowed to travel into the cavity 92 of the main housing 30 until face to face contact is made between contact surfaces 134 of the main housing 30 and the tip 124. That is shown in FIG. 3, which shows a second state of the mate.

The shuttle pin 78 is now moved from its unmated state and begins to travel in mating direction 64 into the female part 14 and in so doing, the bottom 94 of the main housing 30 makes contact with the shoulder 120 of the retainer housing 88 or the seat valve. In other words the conical aperture 42 of the first housing part 38 or the main housing 30 is pushed onto the plug 44 of the second housing part 40 so that the conical aperture 42 mounts the plug 44 in the closed state of the valve 26. Consequently, the valve 26 and thus the main hydraulic lock 18 are closed locking the male connector part 12 and the female connector part 14 towards each other and forming a sealed balancing chamber 22 within the shuttle pin 78. Hence, both hydraulic locks 18, 20 are activated by the mate of the male connector part 12 and the female connector part 14.

The mate sequence can now continue. The shuttle pin 78 is pushed further back, wherein the second retainer element 84' and parts of the first retainer element 84 are pushed over the third retainer element 84" till the end region 122 of the second retainer element 84' abuts against the initials 86 of the female connector part 14. Furthermore, the spring 80 is compressed between the stopper 82 and the stopper 96 of the main housing 30. The connector unit 10 is clamped in this position by a not shown clamp. At the final stage the internal connection of the not shown connection elements, like two optical fibres is made. The mated state of the connector unit 10 is shown in FIG. 6 (Seal 68 is not shown).

During a de-mate the male pin or part 12 cannot part with the shuttle pin 78 due to the main hydraulic lock 18 within the balancing chamber 22, achieved by the closed valve 26. In a rapid de-mate situation the main hydraulic lock 18 will tend to tighten the seal between the plug 44 (retainer housing 88) and its mating face, the conical aperture 42 of the main housing 30. The main hydraulic lock 18 maintains the mate until the main housing 30 and thus the retainer housing 88 reaches the end of its travel (stopped by an abutment of the head of the bolt of the third retainer element 84" at the end region 122 of the second retainer element 84').

When the shuttle pin 78 is positioned back through the front seal 68 and the shuttle pin piston 34 is allowed to travel back along the length of the cavity 92 due to the release of the first or main hydraulic lock 18 and the still activated initial or second hydraulic lock 20. Hence, the initial hydraulic lock 20 of the locking assembly 16 is used to open the main hydraulic lock 18 of the locking assembly 16. In the open state of the valve 26 the conical aperture 42 is free of the plug 44. The male pin or part 12 or its tip 124 will remain in contact with the shuttle pin piston 34 until the seal 56 of the male pin/part 12 exits the cavity 92 and releasing the initial (second) hydraulic lock 20.

In summery the balancing chamber 22 in the shuttle pin 78 is sealed one end by means of the piston 34 which is allowed to travel along the length of the balancing chamber 22 (cavity 92) to accommodate an extruded portion (tip 124) of the male pin or part 12. The opposite end of the balancing chamber 22 has the retainer housing 88 or the seat valve which is open whilst the shuttle pin 78 is in its unmated position allowing the volume compensating medium (oil) to exit freely from the balancing chamber 22 during the initial phase of the mate. As the mate continues and the shuttle pin 76 travels from its unmated position, the valve 26 closes and remains closed during the mate phase. During de-mate, the balancing chamber 22 remains hydraulically locked to the male pin or part 12 due to the closed valve 26 thus preventing separation until the end of the stroke when the valve 26 is opened or the seat valve is unseated, resulting in the release of the main hydraulic lock 18.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A connector unit comprising:
   a first connector part and a second connector part,
   wherein the first connector part and the second connector part are connectable during a mating of the first connector part and the second connector part and are dis-connectable during a de-mating of the first connector part and the second connector part, and
   a first locking assembly for locking a portion of the first connector part and a portion of the second connector part together at least during a portion of the de-mating of the first connector part and the second connector part,
   wherein the first locking assembly comprises a first hydraulic lock,
   wherein the first hydraulic lock comprises a balancing chamber and a valve via which the balancing chamber is fillable and unfillable with an uncompressible fluid.

2. The connector unit according to claim 1,
   wherein the balancing chamber of the first hydraulic lock is encased by a housing and a piston being guided in the housing.

3. The connector unit according to claim 2,
   wherein the first locking assembly comprises a first bias device that is arranged in the balancing chamber and that contacts a part of the balancing chamber and is biased against the piston.

4. The connector unit according to claim 2,
   wherein the housing is arranged in the second connector part and wherein the second connector part is a female part of the connector unit.

5. The connector unit according to claim 1,
   wherein the valve comprises a first housing part and a second housing part and wherein the first housing part and the second housing part are arranged movable relative to each other.

6. The connector unit according to claim 5,
   wherein the first housing part comprises a conical aperture and wherein the second housing part comprises a plug and wherein the conical aperture mounts the plug in a closed state of the valve and wherein the conical aperture is free of the plug in an open state of the valve.

7. The connector unit according to claim 5,
   wherein the second housing part of the valve is held in position by a bias device.

8. The connector unit according to claim 5,
   wherein one of the housing parts of the valve is arranged moveably and wherein another of the housing parts of the valve is arranged fixed relative to a housing of the connector unit.

9. The connector unit according to claim 1,
   wherein the first connector part comprises an element that establishes a second lock of the first locking assembly during the portion of the de-mating of the first connector part and the second connector part.

10. The connector unit according to claim 9,
    wherein the second lock comprises a second hydraulic lock.

11. The connector unit according to claim 10,
    wherein the second hydraulic lock comprises a balancing chamber being encased by a second hydraulic lock housing and wherein the second hydraulic lock comprises a piston being guided in the second hydraulic lock housing and wherein the second hydraulic lock comprises a first seal and a second seal, wherein the first seal is arranged at the second hydraulic lock housing and wherein the second seal is arranged at the second hydraulic lock piston.

12. A method for operating a connector unit comprising a first connector part and a second connector part, wherein the first connector part and the second connector part are connectable during a mating of the first connector part and the second connector part and are dis-connectable during a de-mating of the first connector part and the second connector part, and further comprising a first locking assembly for locking a portion of the first connector part and a portion of the second connector part at least during a portion of the de-mating of the first connector part and the second connector part, the method comprising:
    pushing the first connector part into the second connector part, and thus
    closing a first hydraulic lock of the first locking assembly, and thus
    locking the first connector part and the second connector part with each other, and then
    pulling the first connector part from the second connector part, and thus
    opening the first hydraulic lock by using a second hydraulic lock of the first locking assembly, and thus
    unlocking the first connector part and the second connector part.

13. The method according to claim 12, further comprising:
    activating the first hydraulic lock by the mating of the first connector part and the second connector part.

* * * * *